United States Patent [19]
Kind

[11] 3,803,477
[45] Apr. 9, 1974

[54] APPARATUS FOR DIRECT-CURRENT MEASUREMENT AT A CURRENT RECTIFICATION CIRCUIT ARRANGEMENT

[75] Inventor: Burckart Kind, Schwerzenbach, Switzerland

[73] Assignee: Contraves Antriebstechnik AG, Rumlang, Switzerland

[22] Filed: Sept. 28, 1973

[21] Appl. No.: 401,639

[30] Foreign Application Priority Data
Oct. 13, 1972 Switzerland.................... 15049/72

[52] U.S. Cl............321/5, 321/2, 321/47, 324/119
[51] Int. Cl. ....................................H02m 7/00
[58] Field of Search.............. 321/2, 5, 8; 324/119

[56] References Cited
UNITED STATES PATENTS
3,319,148   5/1967   Kraicar................. 321/119
3,354,375   11/1967   Poppinger et al............. 321/8 R X

*Primary Examiner*—William M. Shoop, Jr.
*Attorney, Agent, or Firm*—Werner W. Kleeman

[57] ABSTRACT

An apparatus for direct-current measurement at a current rectification circuit arrangement, the group or collective direct current of which consists of periodic interrupted individual pulsating direct currents, especially at an anti-parallel circuit arrangement, comprising at least two a.c. converters connected in circuit with the individual direct current branches such that the primary windings thereof carry an interrupted pulsating direct current, however the sum of such interrupted currents at the primary windings constitutes the group current, and the secondary windings of the a.c. converters are connected in series with a respective similarly connected rectifier and parallel to a common load impedance, and a capacitor serving as load impedance is connected in parallel with each secondary winding.

1 Claim, 1 Drawing Figure

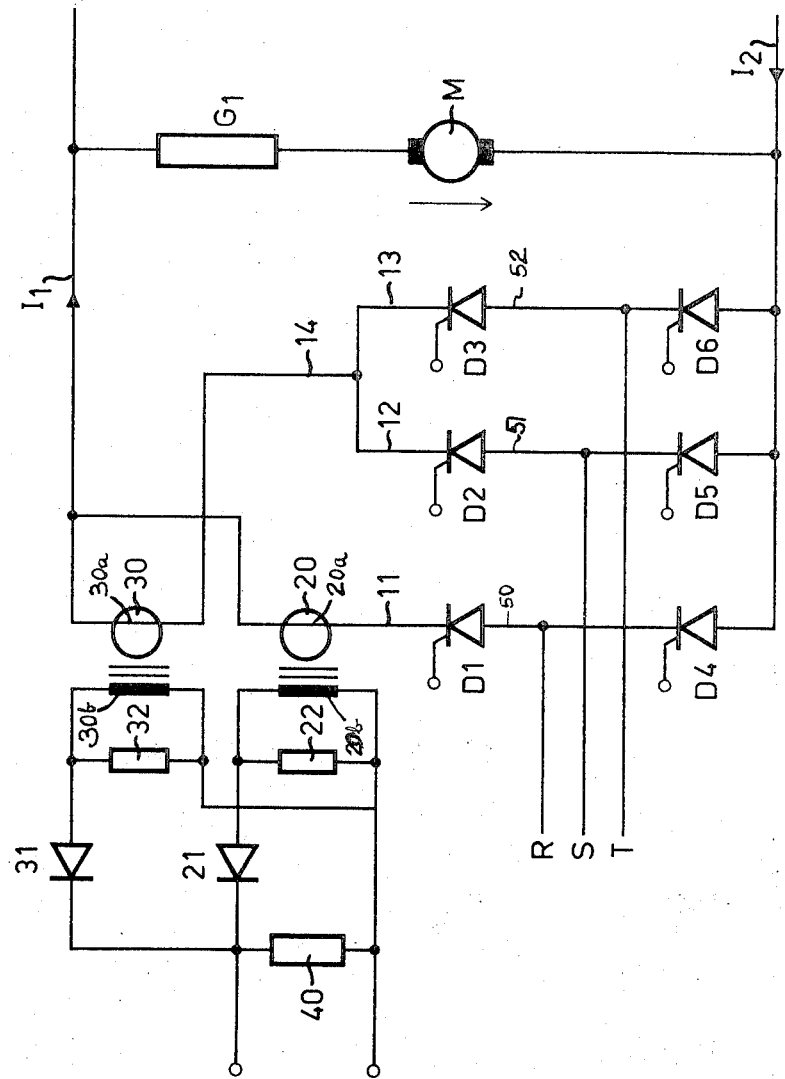

APPARATUS FOR DIRECT-CURRENT MEASUREMENT AT A CURRENT RECTIFICATION CIRCUIT ARRANGEMENT

BACKGROUND OF THE INVENTION

The present invention relates to a new and improved construction of apparatus for direct current measurements at a current rectification circuit arrangement, the group direct current of which consists of periodically interrupted individual pulsating direct currents, especially at an anti-parallel circuit arrangement.

For instance, at anti-parallel circuits at which appear loop currents and which are suitable for generating direct currents for loads operating with reversal of the direction of current flow, the group direct current which is tapped-off the d.c. voltage terminal of a multi-phase bridge should be measured potential free, proportionally and as undistorted in shape as possible. For such d.c. measurements there previously were employed in particular d.c. converters, magnetic amplifiers and choppers. Large bridge currents however require large and heavy d.c. converters. Furthermore, compensation of the non-linearity, temperature-dependency and exemplary scattering of magnetic amplifiers or choppers requires a relatively large circuit expenditure.

SUMMARY OF THE INVENTION

Hence, it is a primary object of the present invention to provide an improved apparatus for the measurement of direct currents at a current rectification circuit arrangement which is not associated with the aforementioned drawbacks and limitations of the prior art proposals.

Now in order to implement this object and others which will become more readily apparent as the description proceeds, the invention is manifested by the features that there are provided at least two alternating current converters, which are arranged and connected at the individual direct current branches in such a way that the primary windings thereof always carry a respective periodically interrupted pulsating direct current, the sum of such periodically interrupted currents in the primary windings corresponding to the group current, and further wherein, the secondary windings of the alternating current converters are connected in series with a respective similarly connected rectifier and parallel to a common load impedance, and parallel to each secondary winding there is connected a capacitor as a load impedance.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE illustrates a circuit diagram of an apparatus for direct current measurement at a current rectification circuit arrangement.

DETAILED DESCRIPTION OF THE PREFERRED EMBODIMENTS

Describing now the drawing there is shown a current rectification bridge having the thyristors $D_1$ to $D_6$, the alternating current sides or terminals 50, 51, 52 of which are coupled with a three-phase network R, S and T respectively. The rectifier bridge load is constituted by a D.C. motor M operating with reversal of the direction of current flow and a forwardly connected smoothing choke or coil $G_1$. In accordance with the firing angle setting of the thyristors $D_1$ to $D_6$ a group or collective direct current $I_1$ is driven in the illustrated direction of flow through the D.C. motor M. In the opposite direction there flows the current $I_2$ through the D.C. motor, this current being generated by the non-illustrated anti-parallel connected second bridge arrangement. For regulating the load current and possibly a bridge loop current the group direct currents $I_1$ and $I_2$ must be measured as regulating magnitudes. An apparatus for the direct current measurement of the group direct current $I_1$ contains both of the alternating current converters 20 and 30, a respective similarly connected or poled free running diode 21 and 31 as the rectifier means, a resistor 40 as the load impedance and a respective loading or load impedance 22 and 32. Flowing through the primary winding 20a of the current converter 20 is the current of the individual direct current- or bridge branch 11 and flowing through the primary winding 30a of the current converter 30 is the current of the individual direct current- or bridge branches 12 and 13 which are connected together into a new bridge branch 14. The current flowing in the branches 11 and 14 is a periodically interrupted, that is to say, null gap exhibiting direct-current The secondary windings 20b and 30b of both current converters 20 and 30 are connected via the respective similarly connected free running diodes 21 and 31 parallel to the resistor 40, so that the voltage course across the resistor 40 is a proportional representation or image of the group current $I_1$.

According to the invention capacitors serving as the loading or load impedances 22 and 32 are connected parallel to the secondary windings 20b and 30b of the current converters 20 and 30, with the result that firstly the voltage peaks which appear at the start of the null gaps of the primary currents in the current converters are limited as much as possible, and secondly for decaying the remanence of the current converters at the null gaps via the capacitor- secondary winding-current circuit through the capacitor-discharge and the oscillation of the secondary current.

The accuracy of the representation of the group current $I_1$ at the resistor 40 can be influenced by the selection of the converters, the load impedance and the loading capacitors. For the direct current measuremnt of the group current $I_2$ of the second bridge there is required a similar apparatus.

With such reliable, simple and economic apparatus it is possible to measure the group direct current free of potential, proportional and extensively undistorted in shape and to further transmit the same.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for direct-current measurements at a current rectification circuit arrangement, the group direct current of which consists of periodically interrupted individual pulsating direct currents, especially at an anti-parallel circuit arrangement, comprising at least two alternating current converters, each alternating current converter having a primary winding and a secondary winding, said alternating current converters being connected at individual direct current branches of said current rectification circuit arrangement in such a manner that the primary windings thereof carry interrupted pulsating direct current, the sum of such interrupted pulsating direct current at the primary windings of said converters constitutes the group current, the secondary windings of said alternating current converters each being connected in series with a respective similarly connected rectifier and parallel to a common load impedance, and a respective capacitor serving as a loading impedance connected in parallel with each secondary winding.

* * * * *